United States Patent
Travis

(10) Patent No.: US 10,156,768 B1
(45) Date of Patent: Dec. 18, 2018

(54) WIDE-ANGLE BEAM STEERER

(71) Applicant: Microsoft Technology Licensing, LLC, Redmond, WA (US)

(72) Inventor: Adrian Robert Leigh Travis, Paris (FR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/717,552

(22) Filed: Sep. 27, 2017

(51) Int. Cl.
*G02F 1/13* (2006.01)
*G02F 1/29* (2006.01)
*G02B 27/01* (2006.01)
*H04N 13/383* (2018.01)
*H04N 13/315* (2018.01)

(52) U.S. Cl.
CPC ........... *G02F 1/29* (2013.01); *G02B 27/0172* (2013.01); *G02F 2001/291* (2013.01); *G02F 2201/122* (2013.01); *G02F 2202/16* (2013.01); *G02F 2203/24* (2013.01); *H04N 13/315* (2018.05); *H04N 13/383* (2018.05)

(58) Field of Classification Search
CPC ................. G02F 1/29; G02F 2001/291; G02F 2201/122; G02F 2202/16; G02F 2203/24; H04N 13/383; H04N 13/315
See application file for complete search history.

(56) References Cited

U.S. PATENT DOCUMENTS

| 4,850,681 | A | 7/1989 | Yamanobe et al. |
| 5,943,159 | A | 8/1999 | Zhu |
| 7,324,286 | B1 | 1/2008 | Glebov et al. |
| 8,054,414 | B2 | 11/2011 | Park et al. |
| 8,506,827 | B2 | 8/2013 | Wu et al. |
| 8,982,313 | B2 | 3/2015 | Escuti et al. |
| 2016/0011441 | A1 | 1/2016 | Schwartz et al. |
| 2016/0124212 | A1* | 5/2016 | Choi ............ H01B 1/124 359/228 |
| 2016/0195779 | A1* | 7/2016 | Ong ............ G02F 1/134309 349/43 |

(Continued)

FOREIGN PATENT DOCUMENTS

WO        9006533 A1    6/1990

OTHER PUBLICATIONS

"Kirigami Nanocomposites as Wide-Angle Diffraction Gratings", In Proceedings of ACS Nano, vol. 10, Issue 6, May 6, 2016, 2 pages.

(Continued)

*Primary Examiner* — Nathanael R Briggs
(74) *Attorney, Agent, or Firm* — Alleman Hall Creasman & Tuttle LLP

(57) ABSTRACT

A light-steering optic comprises a dielectric substrate, a liquid crystal, and a series of transparent conductors. The dielectric substrate has a series of mutually parallel trenches formed therein. A wall of each trench extends up the trench to an adjacent land portion of the dielectric substrate, and the liquid crystal is arranged within each trench. An adherent electrode extends up the wall of the trench and onto a corresponding contact zone, which partly covers the land portion adjacent to that wall. The series of transparent conductors crosses over the series of parallel trenches. Each transparent conductor selectively contacts one or more of the electrodes at a corresponding one or more contact zones.

20 Claims, 10 Drawing Sheets

(56) References Cited

U.S. PATENT DOCUMENTS

2017/0176753 A1* 6/2017 Shi .................... G02F 1/134309

OTHER PUBLICATIONS

Davis, et al., "Electro-optic steering of a laser beam", In Proceedings of the SPIE Newsroom, Jun. 13, 2011, 3 Pages.

Rajasekharan-Unnithan, et al., "Optical phase modulation using a hybrid carbon nanotube-liquid-crystal nanophotonic device", In Journal of Optics Express, vol. 34, No. 8, Apr. 15, 2009, pp. 1237-1239.

Stormonth-Darling, et al., "Injection moulding of ultra high aspect ratio nanostructures using coated polymer tooling", In Journal of Micromechanics and Microengineering, vol. 24, Jun. 23, 2014, pp. 1-12.

Wang, et al., "Nonmechanical Infrared Beam Steering Using Blue Addressed Quantum Dot Doped Liquid Crystal Grating", In Journal of Nanoscale Research Letters, vol. 12, Issue 1, Jan. 13, 2017, 6 Pages.

Isomae, et al., "P-199L: Late-News Poster: Optical Phase Modulation Properties of 1 μm-Pitch LCOS with Dielectric Walls for Wide-Viewing-Angle Holographic Displays". SID Symposium Digest of Technical Papers vol. 47, Issue 1, May 2016, pp. 1670-1673. 4 pages.

"International Search Report and Written Opinion Issued in PCT Application No. PCT/US2018/039223", dated Sep. 18, 2018, 13 Pages.

\* cited by examiner

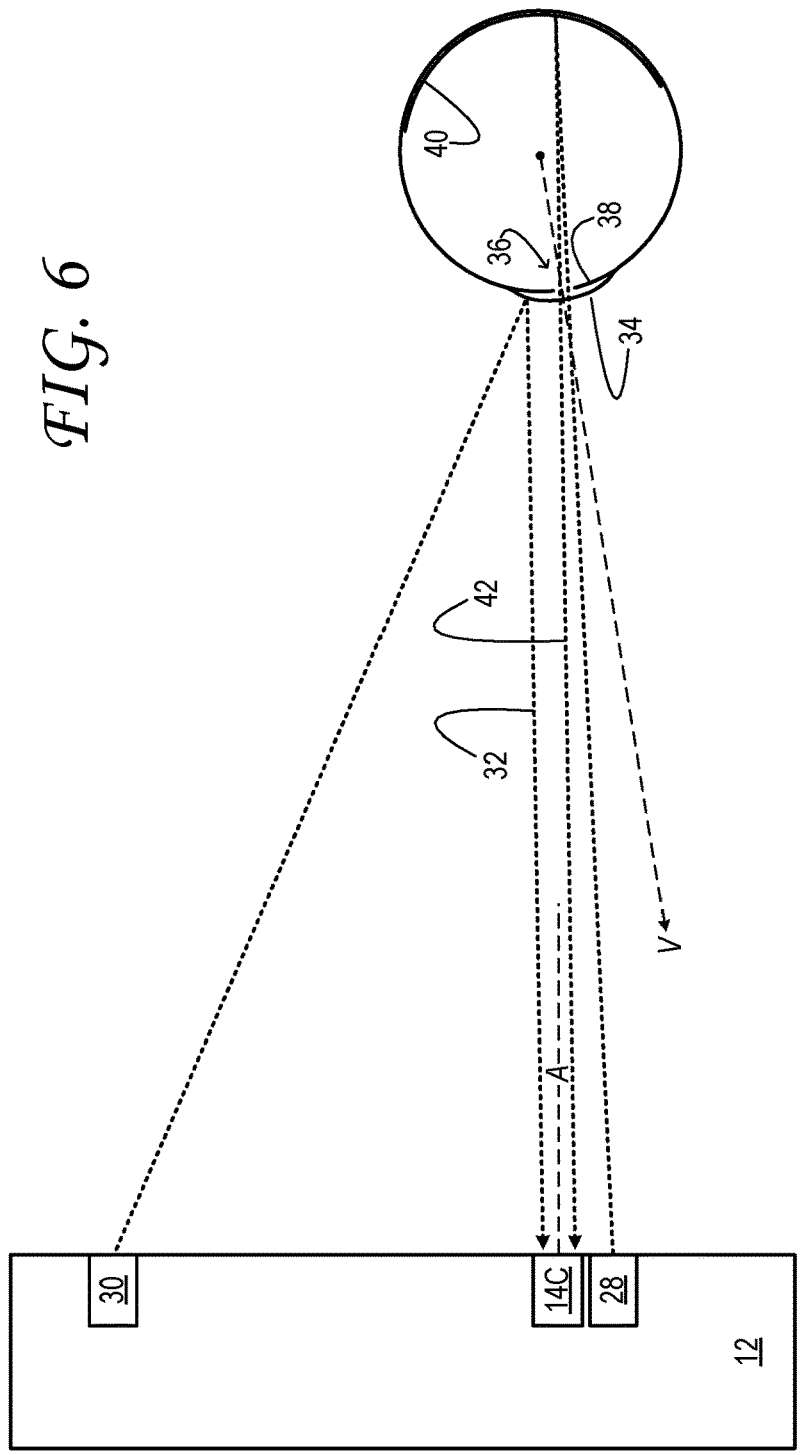

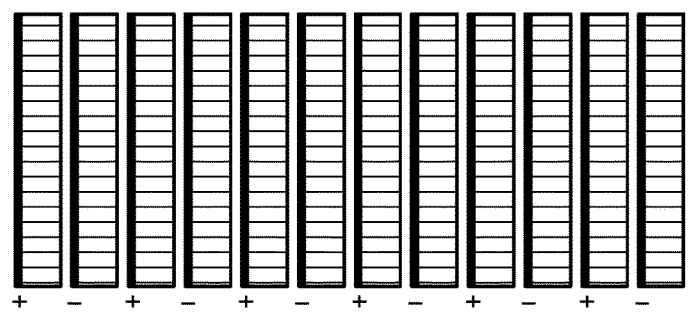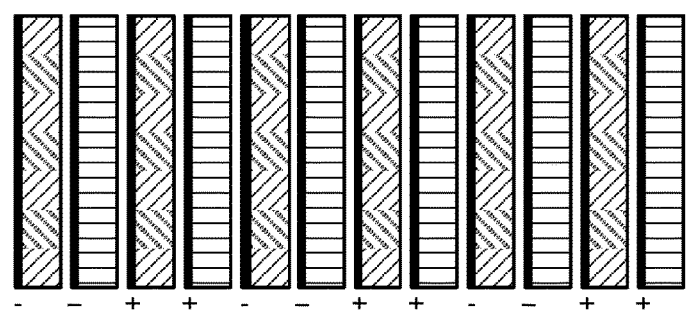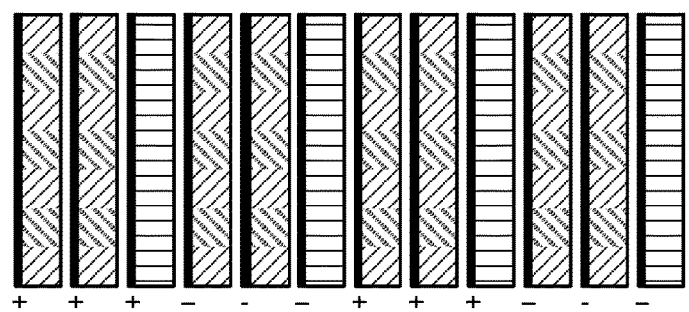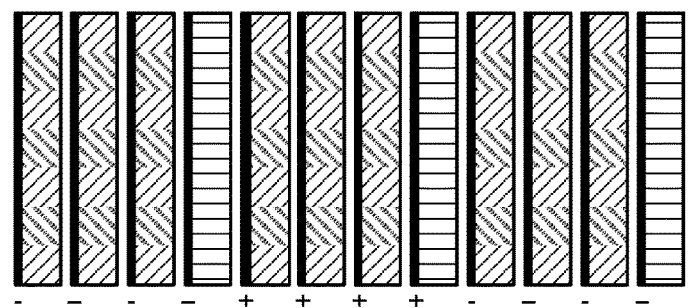
FIG. 9

WIDE-ANGLE BEAM STEERER

BACKGROUND

Digital holography is an emerging field, which has recently made inroads into the consumer-electronics market. Applications of digital holography include near-eye display and game systems that provide virtual- and mixed-reality experiences for the user, as well as large-format 3D video-display systems for the home theatre.

SUMMARY

One aspect of this disclosure is directed to a light-steering optic usable in a wide range of digital-holography implementations. The light-steering optic comprises a dielectric substrate, liquid crystal, and a series of transparent conductors. The dielectric substrate has a series of mutually parallel trenches, with liquid crystal arranged within the trenches. A wall of each trench extends up the trench to an adjacent land portion; an adherent electrode extends up the wall onto a corresponding contact zone, which partly covers the land portion adjacent to that wall. The series of transparent conductors crosses over the series of parallel trenches, each transparent conductor selectively contacting one or more of the electrodes at a corresponding one or more contact zones.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows aspects of pupil-position estimation.

FIG. 9 shows aspects of a differential electrode-biasing scheme used to modify a transmissive grating structure of a light-steering optic.

DETAILED DESCRIPTION

Figure 1:
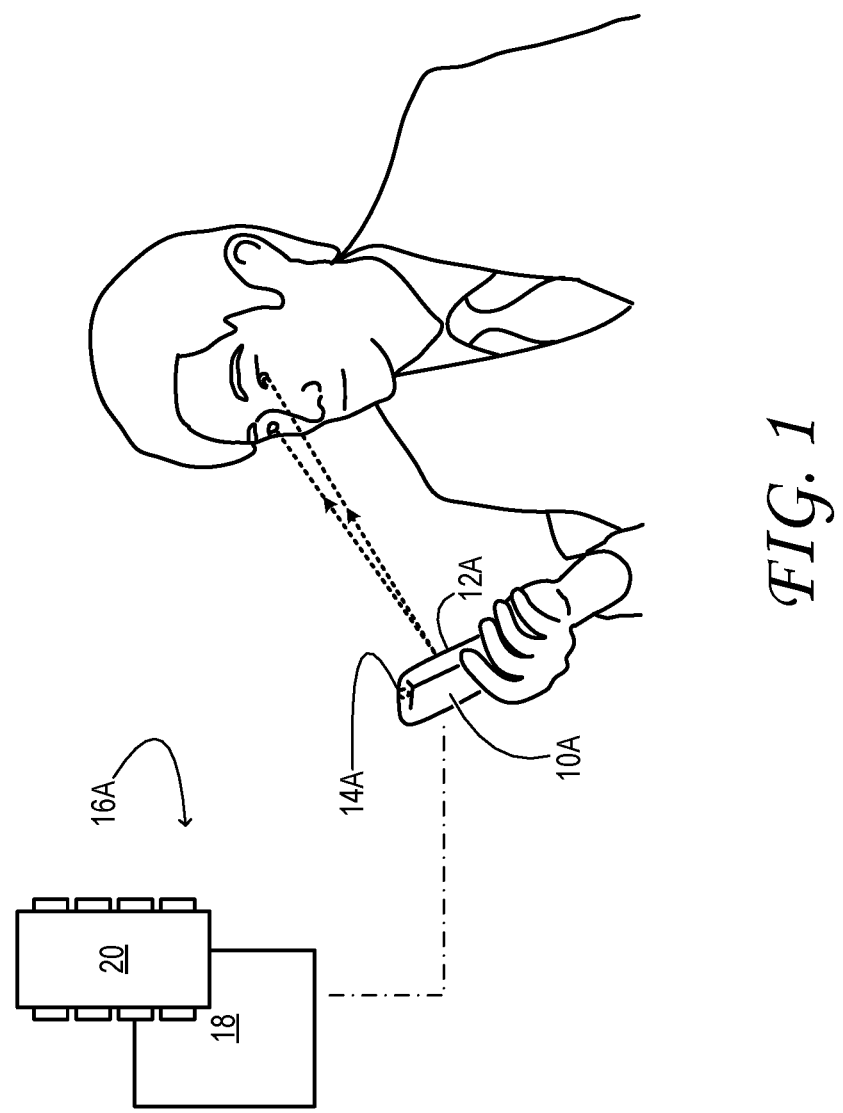
FIGS. 1, 2, and 3 show aspects of example display systems.

This disclosure will now be presented by way of example, and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

Typically, a state-of-the-art electronic display system is configured to form a display image viewable from a wide range of vantage points and viewing angles. Image and backlight diffusers and pupil-expansion optics may be used in a display system to achieve this effect. Providing a large viewing angle and exit pupil in an electronic display system allows for varied viewing scenarios, but also admits of certain disadvantages. In the first place, an electronic display may dissipate significant power in providing adequate image brightness over a large exit pupil or obtuse viewing cone. However, most of that power is used to direct display light along rays that completely miss the viewer's pupils. This aspect is especially important in the context of battery-powered display devices. Second, making a display image viewable over a wide range of angles may compromise a viewer's privacy and distract others not wanting to view the image. Third, any display presentation that is invariant to viewing angle is a natural impediment to lifelike holographic display, where 3D virtual objects are intended to look differently depending on the viewer's vantage point.

One approach that addresses each of the above issues is to dial back on pupil expansion and image diffusion, and to direct the display image only along those rays where the viewer's pupils are predicted to be. In some implementations, the viewer's eyes, face, or body may be imaged in order to provide a suitable prediction of the pupil positions, which may be updated in real time. In order to direct the display image in the predicted direction of the pupils, a light-steering optic may be used. The light-steering optic may be configured to steer the display light through a wide angular range relative to the display normal. In some implementations, the light-steering optic may be capable of changing—faster than the viewer can perceive—the angle by which the display image is steered. This feature may be useful in applications in which display light is directed to multiple pupils and/or viewers, in a time-multiplexed manner. The first three drawings provide non-limiting examples of the implementation context of the light-steering display optics disclosed herein.

FIG. 1 shows aspects of an example display system 10A in the form of a cell phone. Display system 10A includes a display 12A that the viewer can sight while holding the display system. Camera 14A is configured to image the viewer's face with such resolution as to enable the anatomical pupils of the viewer to be resolved. Resolution of the pupils, and other processing, is enacted in computer system 16A, which is integrated within the display system. The computer system includes a logic system 18 and associated computer memory 20, which may be configured to enact whatever digital processing is required for the acts and methods disclosed herein. Pursuant to instructions from the computer system, and based on the positions of the pupils as revealed in the image from camera 14A, display 12A may be configured to direct its display image directly into the viewer's pupils. This feature conserves battery power and protects the viewer's privacy.

Figure 2:
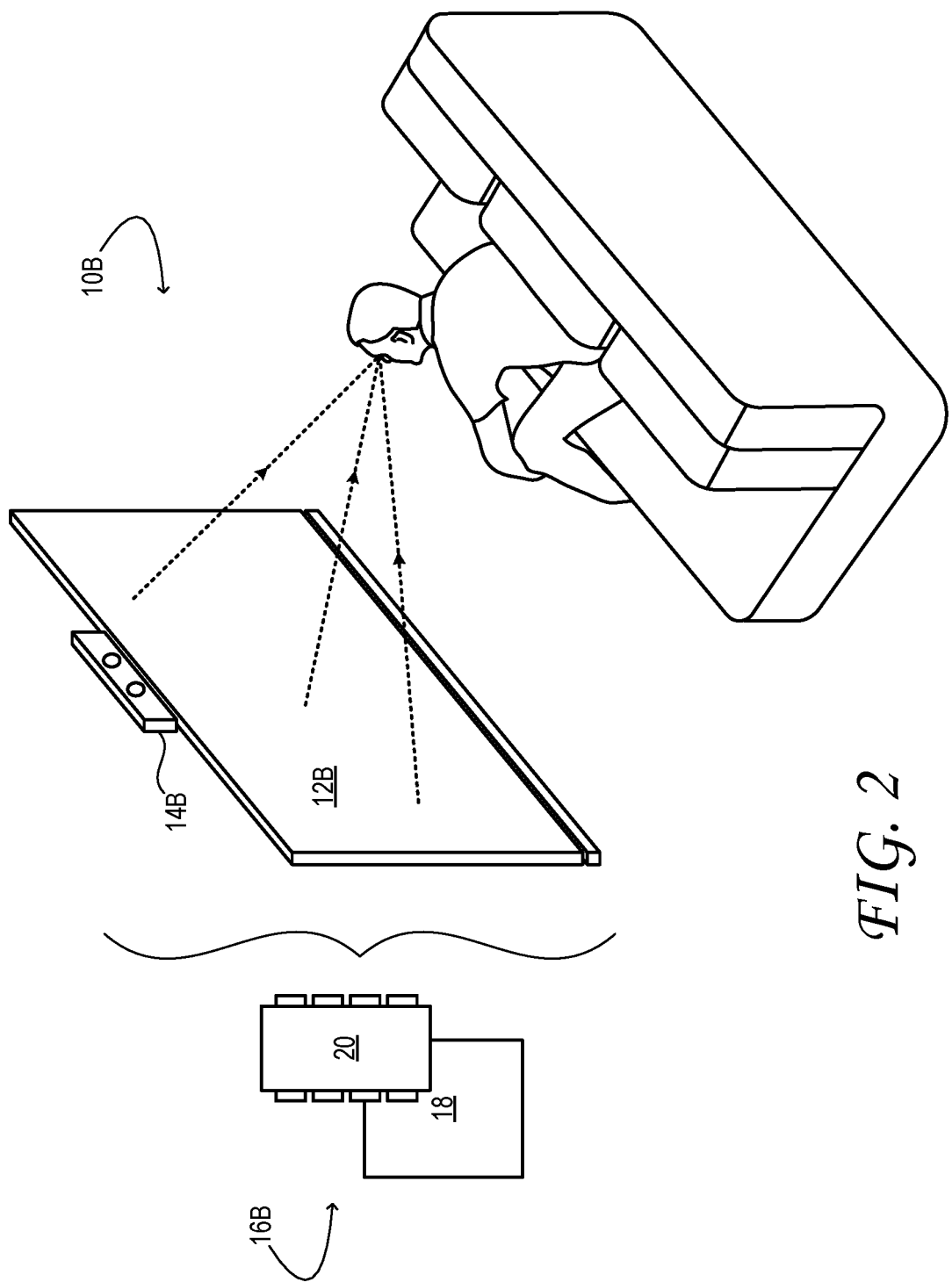

FIG. 2 shows aspects of an example display system 10B in the form of a home-theatre system. Display system 10B includes a wide-screen display 12B viewable from many different vantage points in the viewer's environment. Camera 14B is configured to image the viewer. In some implementations, such imaging may include depth imaging. Computer 16B may be configured to receive image data from the camera and to construct a skeletal model of the viewer's body. The model may be of such precision as to define the position of the head of the viewer, in addition to that of any other viewer able to sight the display. Based on the head positions determined in this manner, and/or via other computer vision face/head recognition, display 12B may be configured to direct display imagery specifically to each viewer's head, in a time-sequential manner.

Directing the display imagery in this manner conserves power, and may be adapted readily to the complementary purpose of preventing the display imagery from being seen by unintended persons—e.g., in scenarios in which the system registers and tracks the movement of an intended viewer and steers the display towards that viewer. This approach is also adaptable to a scenario in which the convergence of the display image is adjusted individually for every intended viewer in the environment, based on the position of the viewer's head relative to the display.

It is further envisaged that display 12B may be configured to present a time-multiplexed sequence of display images, directing each image, one at a time, to a different azimuthal and/or elevational viewing angle. In this manner, viewers observing the display from different vantage points may have appropriately different images steered into their fields of view. This approach holographically simulates the appearance of a virtual 3D object from a series of different vantage points.

Figure 3:
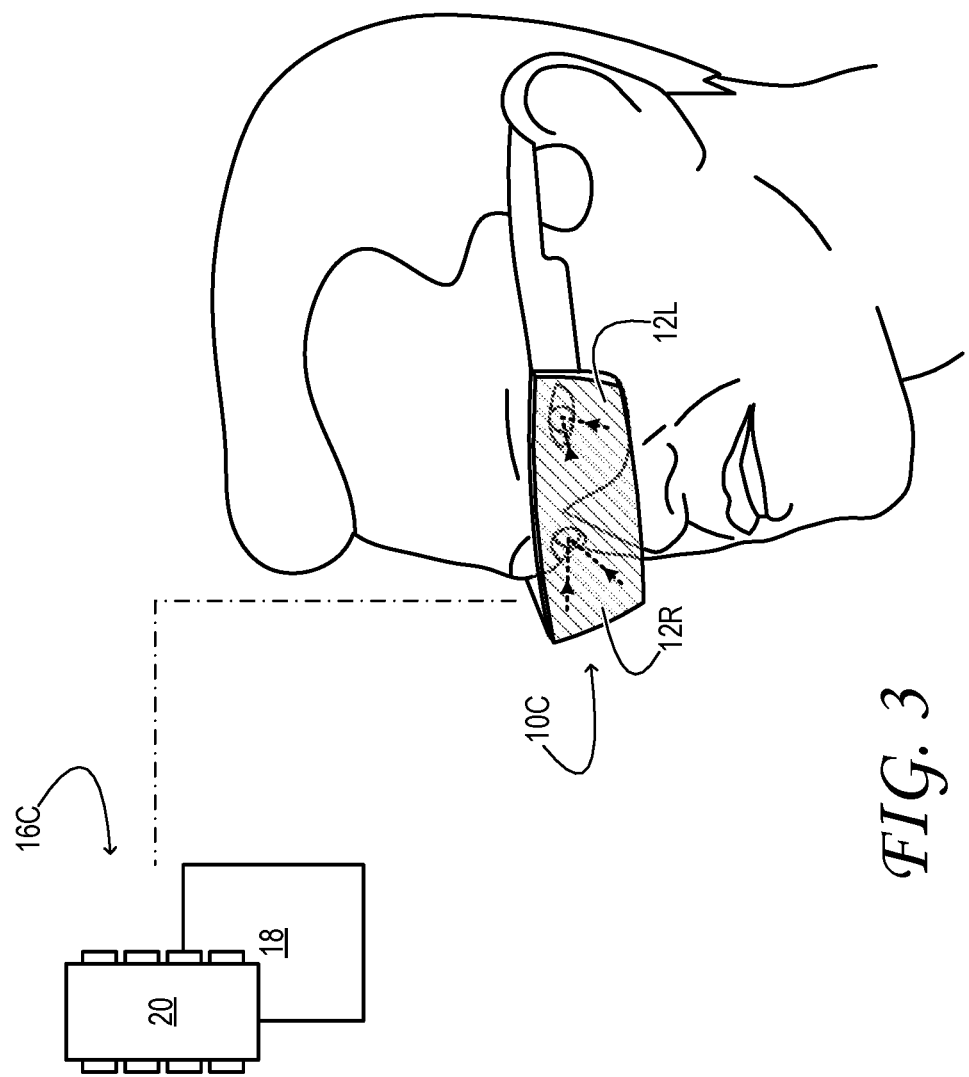

FIG. 3 shows aspects of an example display system 10C in the form of a near-eye display system. The display system includes a right-eye virtual-image display 12R and a left-eye virtual-image display 12L. Display system 10C also includes one or more eye-imaging cameras (not shown in FIG. 3), and a computer system 16C that may be used to determine, inter alia, the viewer's pupil positions. Accordingly, the right- and left-eye virtual-image displays may be configured to steer display imagery directly into the respective right or left pupil of the viewer.

As noted above, steering display imagery into the pupils conserves power. Further, in near-eye display implementations, where the display image is a virtual image, directing display imagery into the pupils may lessen the degree of pupil expansion required of the projection optics. In some configurations, significant pupil expansion may be used to prevent vignetting, or loss of image brightness, when the display system is imperfectly aligned to the viewer's face. Further still, image steering as described herein provides additional advantages for display of virtual objects using a binocular near-eye display system, as shown in FIG. 3. To better illustrate these advantages, disparity-based 3D image rendering will be described, with reference to FIGS. 4 and 5.

Figure 5:
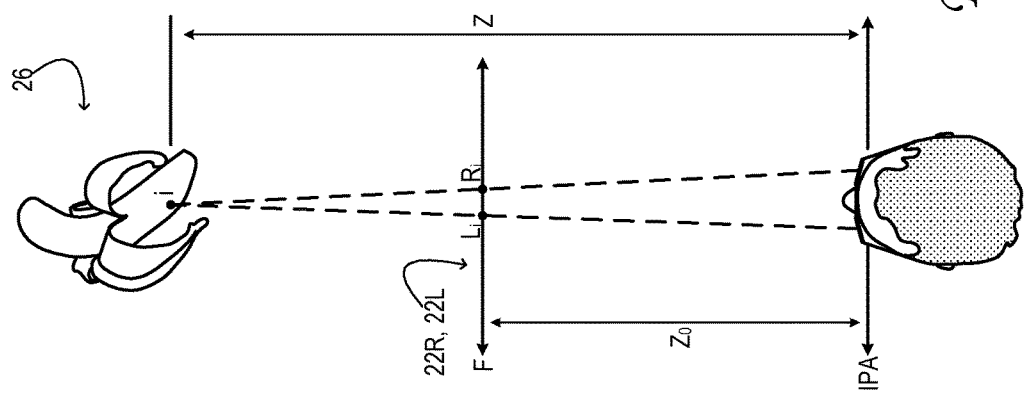
FIGS. 4 and 5 show aspects of virtual-object display.
Figure 4:
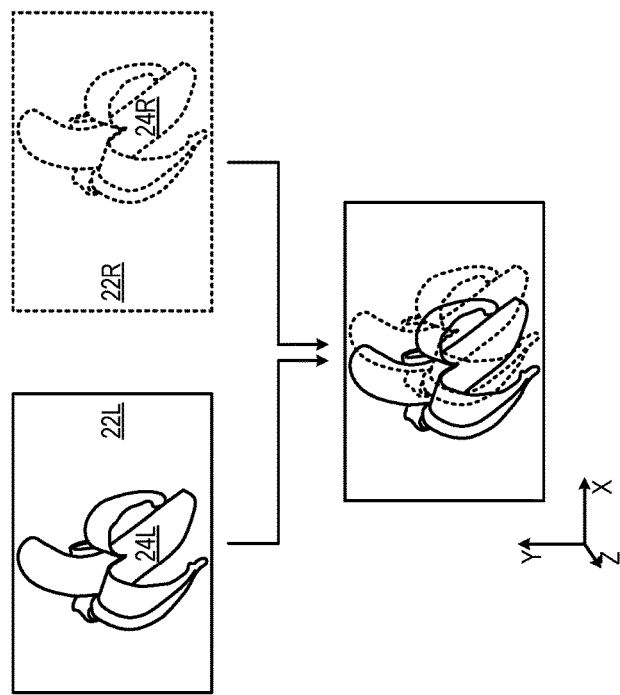

The viewer's perception of distance to virtual display imagery presented via display system 10C is affected by positional disparity between complementary right and left display images. This principle is illustrated by way of example in FIG. 4. FIG. 4 shows right and left image frames 22R and 22L, overlaid upon each other for purpose of illustration. The right image frame encloses right display image 24R, and the left image frame encloses left display image 24L. Rendered appropriately, the right and left display images may appear to the viewer as virtual imagery. In the example of FIG. 4, the virtual imagery presents a surface of individually rendered loci. With reference now to FIG. 5, each locus i of the viewable surface has a depth coordinate $Z_i$ associated with each pixel $(X_i, Y_i)$ of the right and left display images. The desired depth coordinate may be simulated in the following manner.

At the outset, a distance $Z_0$ to a focal plane F of display system 10C is chosen. The left and right optical systems may be configured to present their respective display images at a vergence appropriate for the chosen distance. In one example, $Z_0$ may be set to 'infinity', so that each optical system presents a display image in the form of collimated light rays. In another example, $Z_0$ may be set to two meters, requiring the optical system to present each display image in the form of diverging light. In some examples, $Z_0$ may be chosen at design time and remain unchanged for all virtual imagery presented by the display system. Alternatively, the optical systems may be configured with electronically adjustable optical power, to allow $Z_0$ to vary dynamically according to the range of distances over which the virtual imagery is to be presented.

Once the distance $Z_0$ to the focal plane has been established, the depth coordinate Z for every locus i on the viewable surface may be set. This is done by adjusting the positional disparity of the two pixels corresponding to locus i in the right and left display images, relative to their respective image frames. In FIG. 5, the pixel corresponding to locus i in the right image frame is denoted $R_i$, and the corresponding pixel of the left image frame is denoted $L_i$. In FIG. 5, the positional disparity is positive—i.e., $R_i$ is to the right of $L_i$ in the overlaid image frames. Positive positional disparity causes locus i to appear behind focal plane F. If the positional disparity were negative, the locus would appear in front of the focal plane. Finally, if the right and left display images were superposed (no disparity, $R_i$ and $L_i$ coincident) then the locus would appear to lie directly on the focal plane. Without tying this disclosure to any particular theory, the positional disparity D may be related to Z, $Z_0$, and to the interpupilary distance (IPD) of the viewer by $$D = IPD \times \left(1 - \frac{Z_0}{Z}\right).$$

In the approach described above, the positional disparity sought to be introduced between corresponding pixels of the right and left display images is 'horizontal disparity'—viz., disparity parallel to the interpupilary axis of the viewer of display system 10. Horizontal disparity mimics the effect of real-object depth on the human visual system, where images of a real object received in the right and left eyes are naturally offset along the interpupilary axis.

In one implementation, logic in computer system 16C maintains a model of the Cartesian space in front of the viewer, in a frame of reference fixed to display system 10C. The viewer's pupil positions are mapped onto this space, as are the image frames 22R and 22L, which are positioned at the predetermined depth $Z_0$. (The reader is again directed to FIGS. 4 and 5.) Then, virtual imagery 26 is constructed, with each locus i of a viewable surface of the imagery having coordinates $X_i$, $Y_i$, and $Z_i$, in the common frame of reference. For each locus of the viewable surface, two-line segments are constructed—a first line segment to the pupil position of the viewer's right eye and a second line segment to the pupil position of the viewer's left eye. The pixel $R_i$ of the right display image, which corresponds to locus i, is taken to be the intersection of the first line segment in right image frame 22R. Likewise, the pixel $L_i$ of the left display image is taken to be the intersection of the second line segment in left image frame 22L. This procedure automatically provides the appropriate amount of shifting and scaling to correctly render the viewable surface, placing every locus i at the required distance from the viewer.

In view of the foregoing description and drawings, the skilled reader will understand that the ability to steer display light independently from different portions of the right and left image frames provides a refinement over any approach in which the distance out to a display locus is set by the disparity alone. In effect, the ability to steer the display light in real time provides real-time control over the vergence, or equivalently, the position $Z_0$ of focal plane F. This is especially valuable in scenarios in which some virtual display objects are to be displayed far away ($Z_0=\infty$), and others quite close to the viewer's face.

FIG. 6 is provided in order to illustrate, somewhat schematically, how the viewer's pupil positions may be sensed in near-eye display system 10C. However, the principles disclosed herein are also applicable to pupil tracking using remote camera systems (cameras 14A and 14B, for example). The configuration illustrated in FIG. 6 includes, for each of the right and left virtual-image displays 12, a camera 14C, an on-axis lamp 28 and an off-axis lamp 30. Each lamp may comprise a light-emitting diode (LED) or diode laser, for example, which emits infrared (IR) or near-infrared (NIR) illumination in a high-sensitivity wavelength band of the camera.

The terms 'on-axis' and 'off-axis' refer to the direction of illumination of the eye with respect to the optical axis A of camera 14C. As shown in FIG. 6, off-axis illumination may create a specular glint 32 that reflects from the viewer's cornea 34. Off-axis illumination may also be used to illuminate the eye for a 'dark pupil' effect, where pupil 36 appears darker than the surrounding iris 38. By contrast, on-axis illumination from an IR or NIR source may be used to create a 'bright pupil' effect, where the pupil appears brighter than the surrounding iris. More specifically, IR or NIR illumination from on-axis lamp 28 may illuminate the retroreflective tissue of the retina 40, which reflects the illumination back through the pupil, forming a bright image 42 of the pupil. Image data from the camera is conveyed to associated logic in computer system 16C. There, the image data may be processed to resolve such features as one or more glints from the cornea, or the pupil outline. The locations of such features in the image data may be used as input parameters in a model—e.g., a polynomial model—that relates feature position to the apparent center of the pupil.

The above description should not be understood as limiting in any sense, because pupil position may be determined, estimated, or predicted in various other ways. In one example, an electrooculographic sensor may be employed. In other examples, it may be sufficient to determine the location of the viewer's eyes or head—e.g., by skeletal tracking, as noted above.

Figure 7B:
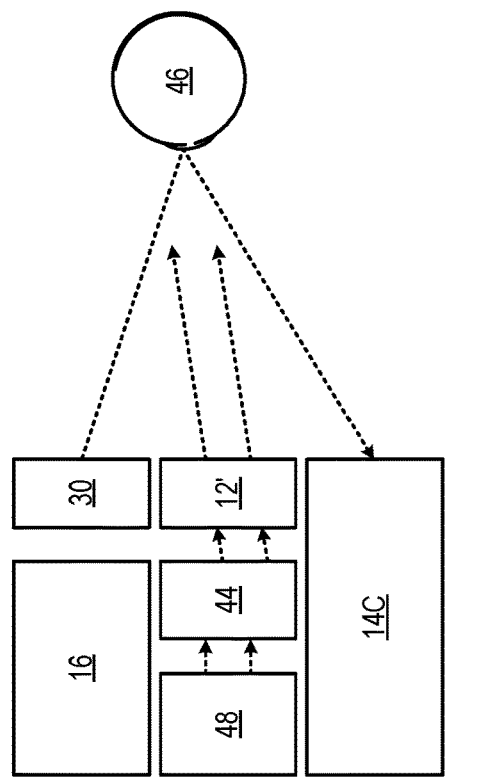
FIGS. 7A and 7B show aspects of example display systems, each including a light-steering optic.
Figure 7A:
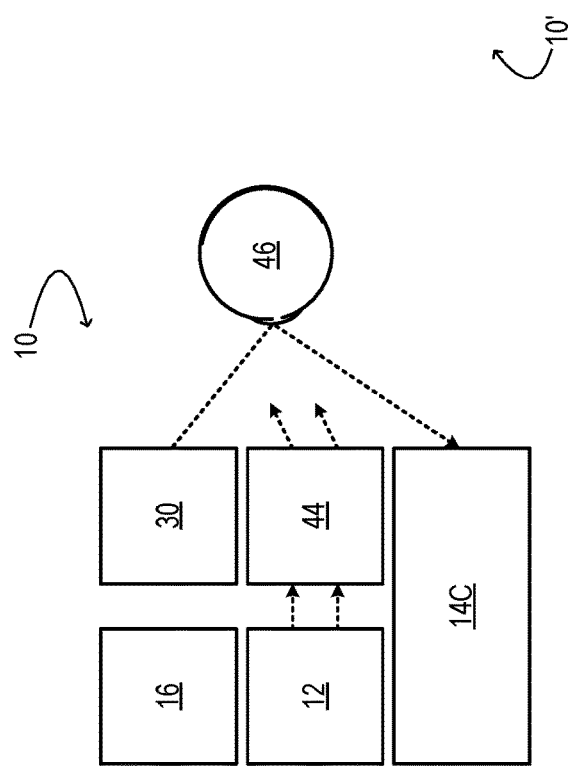

FIG. 7A is a schematic representation of a display system 10 as introduced above, including camera 14C and off-axis lamp 30. In FIG. 7A, the display image is formed by display 12. The form of display 12 may differ from one embodiment to the next. Display 12 may comprise a transmissive liquid crystal display (LCD), or a reflective liquid-crystal-on-silicon (LCOS) display. In other examples, the display may comprise a beam scanner. The display is operatively coupled to computer system 16, which provides or conveys the appropriate electronic signal to display 12 for forming the desired display image. In the configuration of FIG. 7A, display system 10 includes a light-steering optic 44 configured to steer the display image to the viewer's eye 46, at a specified one or more angles, as further described below.

FIG. 7B is a schematic representation of another display system 10'. In FIG. 7B, display 12' takes the form of a transmissive LCD, illuminated by a backlight 48. In this example, the light-steering optic steers non-image-carrying emission from the backlight, and directs the emission onto the LCD display at a specified one or more angles, as further described below. The configuration of FIG. 7B may be desirable for a display system 10' of relatively large dimensions, although smaller backlit display system are also envisaged.

Figure 8:
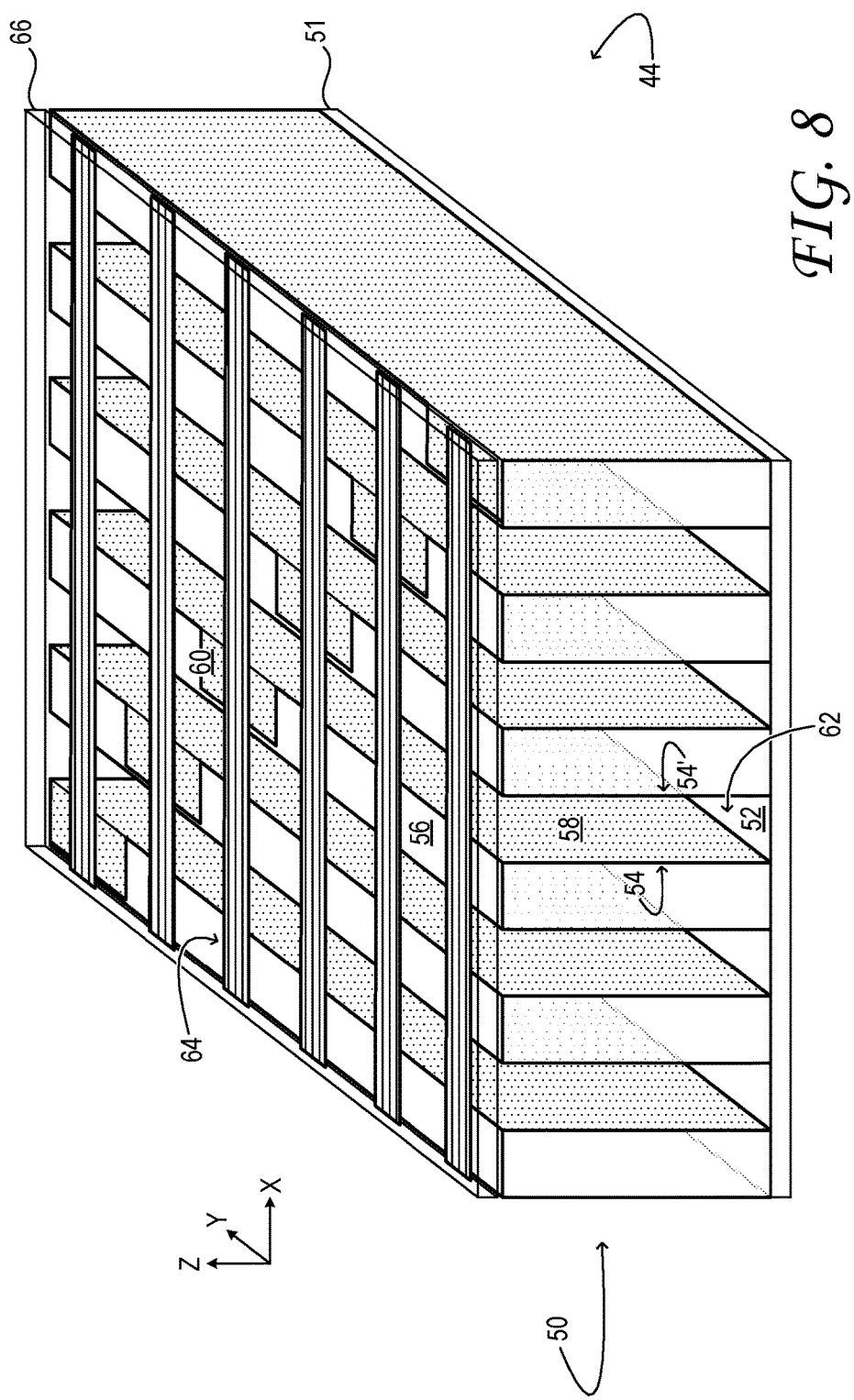
FIG. 8 shows aspects of an example light-steering optic.

FIG. 8 shows aspects of an example light-steering optic 44. The light-steering optic includes a dielectric substrate 50. The dielectric substrate comprises an optically transparent material, such as a transparent plastic or glass. 'Optically transparent' means that the transmittance in the intended wavelength band, along the intended optical path, and integrated over the entire substrate, is suitable for display applications. The transmittance may be 90% or greater, for instance—95% or greater in some examples. In general, the 'intended wavelength band' is the emission band of the display or backlight that feeds into light-steering optic 44. The intended wavelength band may be monochromatic, trichromatic, polychromatic, etc. The 'intended optical path', with reference to FIG. 8, is any path along a vertical line passing through the substrate, in the ±Z direction. In some examples, dielectric substrate 50 may comprise polycarbonate; in some examples, dielectric substrate 50 may comprise acrylic. Other optically transparent substrates are also envisaged.

The dimensions of dielectric substrate 50 are not particularly limited. In an example display implementation, the dielectric substrate may be as long and wide as the exit pupil of the display or backlight that feeds into light-steering optic 44. In a near-eye display implementation, the dielectric substrate may be on the order of millimeters, for example. In an example flat-screen implementation, the dielectric substrate may be on the order of meters. In the configuration shown in FIG. 8, substrate 50 includes a base portion 51 in the form of an optical flat. Display light may be received through the base portion, in some examples; in other examples, it may emerge from the base portion. In some examples, the base and remaining portions of the dielectric substrate may be monolithic.

As shown in FIG. 8, dielectric substrate 50 has a series of mutually parallel trenches 52 formed within it. The series of trenches may run the entire width X of light-steering optic 44. The trenches may be formed by embossing, injection molding, machining, or layering. In some examples, the series of trenches may have a submicron period. The submicron period enables the light-steering optic to deflect incoming rays by sharper angles, and may also be useful for preventing ambient light from reflecting into the viewer's eyes. In some examples, the depth of each trench, in the Z direction, may be at least 2 microns. A trench of such depth provides a relatively long optical path for rays undergoing deflection. An optical path length of the order of 2 microns (3 microns or more in some examples) is capable of delaying the phase of the light rays by one wavelength or more, which is necessary in order to steer the ray without diffraction into unwanted orders.

The series of trenches 52 of dielectric substrate 50 have opposing side walls 54 and 54', which run the entire length of the trenches. The side walls of each trench extend up the trench to an adjacent land portion of the dielectric substrate. In particular, side wall 54 in FIG. 8 extends up to adjacent land portion 56. Each land portion of the dielectric substrate separates one trench from a neighboring trench in the series.

In the illustrated example, each of the land portions lies in a common plane. In other examples, at least some of the land portions may have different elevations.

Every trench 52 in the series of trenches is associated with at least one adherent electrode. In some examples, each of the adherent electrodes may comprise a metallic sputter coating—e.g., a coating of aluminum, copper, nickel, and/or other metals or alloys. In FIG. 8, exactly one adherent electrode 58 is provided for each trench. The adherent electrode extends up side wall 54 of the trench and onto a corresponding contact zone 60 on the land portion 56 adjacent to that side wall. It will be noted that the adherent electrode may substantially cover the side wall to which it adheres, but covers only part of the land portion adjacent to the side wall—viz., the part bounded by the corresponding contact zone.

Liquid crystal 62 is deposited within each trench 52. The liquid crystal may be a nematic liquid crystal, in some examples. The purpose of adherent electrodes 58 is to provide electrostatic bias to the liquid crystal, which changes the state of alignment of the molecules of the liquid crystal. To that end, a series of optically transparent conductors 64 are positioned on dielectric substrate 50 to make electrical contact with the adherent electrodes. More particularly, the series of optically transparent conductors 64 cross over the series of mutually parallel trenches 52.

In some examples, each of the optically transparent conductors 64 may comprise a degenerately doped semiconductor, such as indium tin oxide. Other types of conductors are also envisaged. In FIG. 8, each of the optically transparent conductors runs perpendicular to each of the trenches 52; however, the optically transparent conductors may instead be oblique to the trenches, in the sense that the series of optically transparent conductors may be rotated about the Z axis, with respect to the series of mutually parallel trenches. Moreover, although the optically transparent conductors in FIG. 8 are shown orthogonal to the trenches, the series of trenches may instead be set at an angle with respect to the series of optically transparent conductors, to the base portion, to the cover layer, etc. In other words, each trench may be rotated equivalently about the Y axis, so that the trenches and transparent conductors are no longer orthogonal.

The relevant condition, in any case, is that the two series cross each other, so that each optically transparent conductor 64 may selectively contact one or more of the electrodes 58 at corresponding contact zones 60 of the one or more electrodes. This feature is advantageous, because it enables a series of conductors with exposed terminals to address all of the electrodes in the structure. By contrast, any alternative configuration having liquid-crystal cells 'landlocked' within the dielectric substrate would require a thin-film transistor (TFT) array for appropriate addressing. This would add to the cost, complexity, and latency of the light-steering optic. Nevertheless, configurations having divided trenches and electrodes addressed via a TFT array may be useful in implementations where the azimuthal and elevational convergence are to be varied independently of each other.

Returning now to FIG. 8, in some implementations, the series of optically transparent conductors 64 may be arranged on the underside of a cover layer 66, which is supported by the land portions 56 of dielectric substrate 50. The cover layer may completely cover the substrate and, together with base portion 51, may seal liquid crystal 62 within the trenches.

In the example shown in FIG. 8, each optically transparent conductor 64 makes contact with exactly one adherent electrode 58. This configuration allows the liquid crystal within each trench 52 to be independently biased—viz., independent of the bias state of the liquid crystal in the other trenches. Fully independent biasing is desirable for controlling display image convergence, as discussed hereinafter. In other examples, each optically transparent conductor may make contact with a plurality of electrodes separated one from the next by an equal number of trenches. This configuration enables the electrodes to be addressed in groups, and is desirable when the entire display image or backlight is to be diverted by the same angle, as discussed hereinafter. A combination of the two approaches is also envisaged, where the interior (e.g., interior 75%) of the trenches of dielectric substrate 50 are addressed in periodic groupings, but the trenches on the ends of the substrate are addressed individually, or in smaller groupings.

Broadly speaking, light-steering optic 44 is a transmissive grating structure having a controllably variable period. The electrical bias applied to each adherent electrode 58 determines the state of alignment of the liquid crystal 62 within the associated trench. The alignment, in turn, determines whether (or to what degree) the trench functions as a blazed line of the grating structure. In the simplest example, a trench receiving active bias diffracts an incoming light ray as though it were a blazed line, while a trench receiving no bias allows the ray to pass through undiffracted. Accordingly, a light-steering optic with N trenches per linear inch would appear to an incoming ray as transmissive grating of period 1/N if all of the trenches were biased. If every other trench were biased, it would appear as a grating of period 2/N, and so on. The skilled reader will understand, with benefit of this disclosure, that the angle of deflection of an incoming ray of a given wavelength will decrease as the effective period of the grating structure decreases.

In the example of FIG. 8, only one electrode 58 is provided for each trench 52. Accordingly, an appropriate addressing scheme for this configuration is one in which the differential bias of adjacent electrodes determines the state of alignment of the liquid crystal 62 between the adjacent electrodes. FIG. 9 illustrates one example differential biasing scheme. Each series of rectangular blocks in FIG. 9 represents the series of trenches. The dark vertical line at the left of each block is the associated electrode, which is biased positively or negatively, as indicated in the drawing. Horizontal hashing in a block indicates that the liquid crystal therein is aligned; zigzag hashing indicates that the liquid crystal is not aligned. Thus, controlling the electrode bias across the series of trenches provides a way to control the grating period of the light-steering optic.

Figure 10:
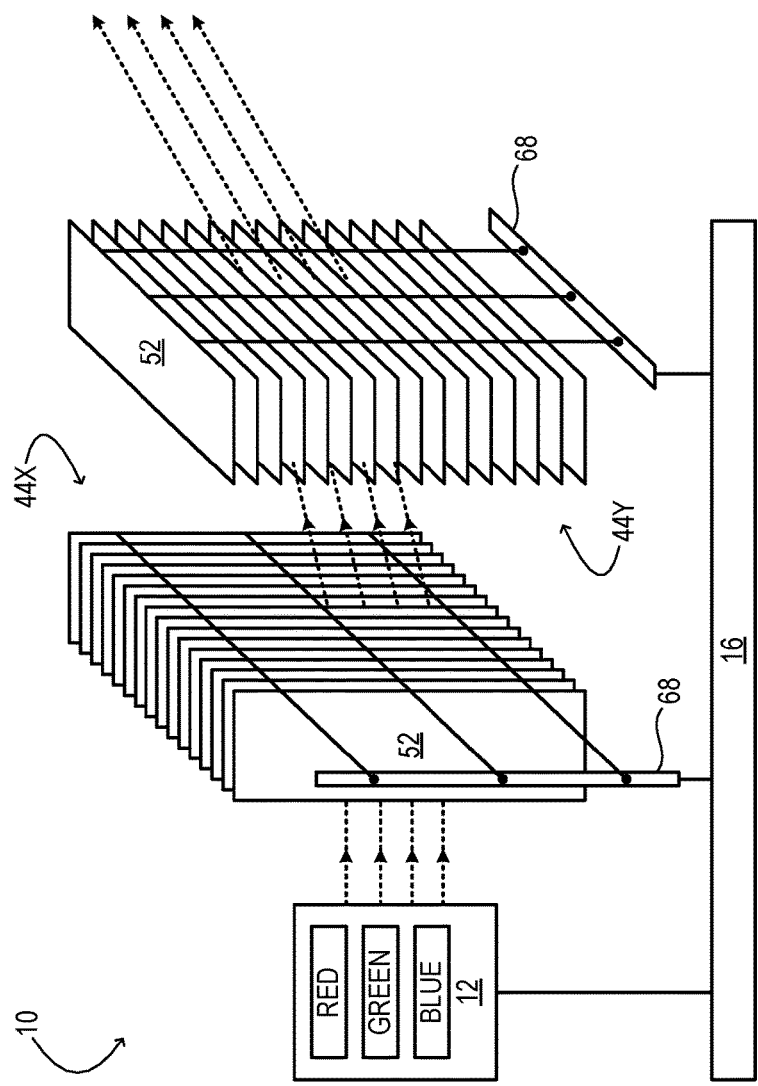
FIG. 10 show aspects of another example display system, which includes two light-steering optics.

FIG. 10 is a schematic representation of a display system 10 comprising a display 12 and light steering optics 44X and 44Y arranged optically downstream of the display. In FIG. 10, the light-steering optics are represented as stacks of rectangles corresponding to the series of mutually parallel trenches of each optic. The mutually parallel trenches of the light-steering optic 44Y are orthogonal to those of the light-steering optic 44X. Controller 16 of FIG. 10 is operatively coupled to each optically transparent conductor 64 of light-steering optics 44X and 44Y via driver interface 68, and configured to control the electrical bias applied to each optically transparent conductor.

Display 12 provides the display image received by light-steering optic 44X. In some examples, the display may take the form of a near-eye microprojector configured to project a virtual display image. In the example of FIG. 10, light-steering optic 44X deflects the display image by a controllable azimuth angle, relative to the optical axis of the display. Light-steering optic 44Y deflects the display image by a controllable elevation angle.

In the illustrated example, the virtual display image may include a sequence of monochromatic component images differing in color. Controller 16 may be configured to change the electrostatic bias applied to the optically transparent conductors as the color of the component image changes, in order to steer corresponding pixels of each component image by an equivalent angle. This action may be taken to avoid color break-up, as different wavelengths of light would be deflected differently by a grating of a given period.

In this and other examples, controller 16 may be configured to bias each of the optically transparent conductors so as to steer each pixel of the entire display image by an equivalent or near equivalent angle, as shown in FIG. 10. This control mode is desirable when the entire display image is to be steered in a predetermined direction, such as into the viewer's pupil. In other examples, the controller may be configured to bias each of the optically transparent conductors to steer different pixels of the display image by different angles, so as to vary a point of convergence of the display image. This scenario is represented back in FIG. 2.

Figure 11:
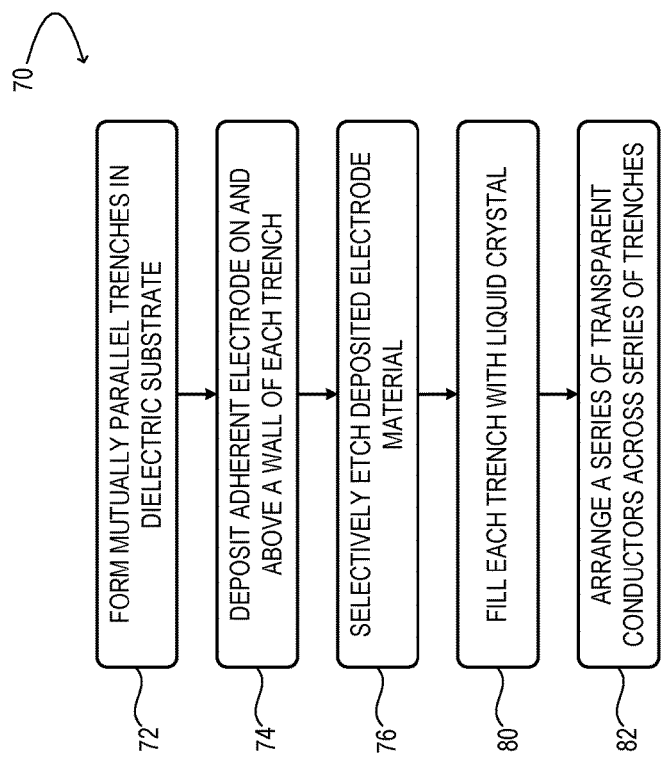
FIG. 11 illustrates an example method for making a light-steering optic.

FIG. 11 illustrates an example method 70 for making a light-steering optic as described hereinabove. At 72 of method 70, a series of mutually parallel trenches is formed in a dielectric substrate, a wall of each trench extending up the trench to an adjacent land portion of the dielectric substrate, the land portion separating that trench from a neighboring trench in the series. In some examples, the series of parallel trenches may be formed by injection molding. In other examples, the series of parallel trenches may be formed by micromachining, embossing or layering.

Figure 12:
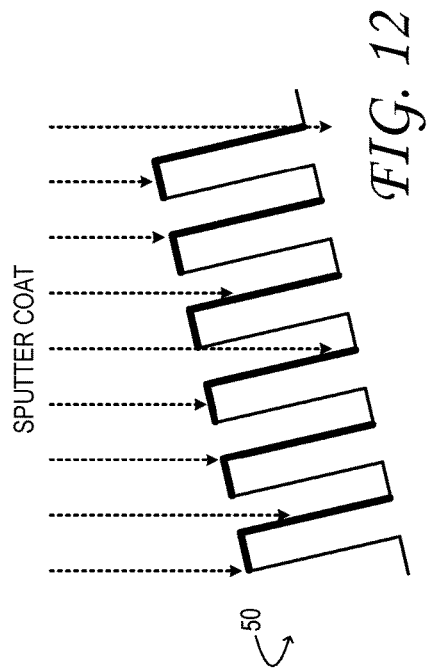
FIGS. 12 and 13 illustrate a portion of an example light-steering optic during manufacture.

At 74, an adherent electrode is deposited on and above a wall of each trench and onto a corresponding contact zone, the contact zone partly covering the land portion adjacent to that wall. In some examples, the act of depositing the adherent electrode on the wall surface may include sputtering from an angle oblique to the trenches, such that the wall and adjacent land portion is coated, but a base and opposite wall of each trench remain uncoated. FIG. 12 illustrates this approach.

Figure 13:
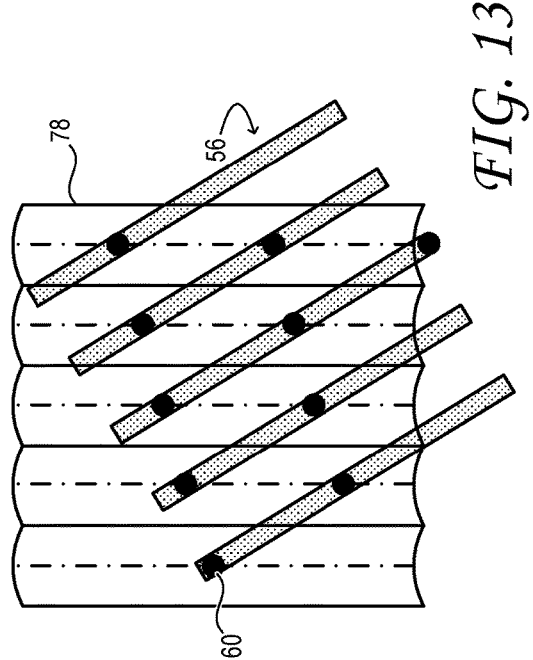

At 76, electrode material deposited on the land portions of the substrate is selectively etched, so as to remove the electrode material from the land portions, except over the predetermined contact zones. In one example, selective etching begins with a blanket application of an ultraviolet (UV) curable photoresist over all of the land portions of the substrate. The photoresist is then cured by exposure to UV from a direction normal to the land portions, through a 2D lenticular array. As shown in FIG. 13, lenticular array 78 may be positioned between a collimated UV source and the substrate, with the distance of separation between the array and land portions 56 being approximately one focal length of the 1D lenticules of the array. The lenticular array is then rotated with respect to the series of land portions 56, such that the mutually parallel focal axes of the 1D lenticules of the array are oblique to the land portions.

This configuration focuses the UV irradiance on the common plane of the focal axes, which intersect the land portions at repeating intervals. By adjusting the angle of rotation of the lenticular array with respect to the series of land portions, the series of intersection points can be made to coincide with the desired contact zones 60. After the photoresist is selectively cured in this manner, uncured photoresist is rinsed away, and the electrode material is etched chemically from the rest of the land portions (areas that were not irradiated). Cured photoresist is then removed with the aid of a solvent.

At 80 of method 70, each trench is filled, at least partially, with liquid crystal. At 82 a series of optically transparent conductors is arranged across the series of parallel trenches, such that each optically transparent conductor selectively contacts one or more of the electrodes at corresponding contact zones of the one or more electrodes.

One aspect of this disclosure is directed to a light-steering optic, comprising: a dielectric substrate having a series of mutually parallel trenches formed therein, a wall of each trench extending up the trench to an adjacent land portion of the dielectric substrate, the land portion separating that trench from a neighboring trench in the series; for each trench, an adherent electrode extending up the wall of the trench and onto a corresponding contact zone, the contact zone partly covering the land portion adjacent to that wall; liquid crystal within each trench; and a series of transparent conductors crossing over the series of parallel trenches, each transparent conductor selectively contacting one or more of the electrodes at a corresponding one or more contact zones.

In some implementations, the series of parallel trenches has a submicron period. In some implementations, each of the trenches is at least two microns deep. In some implementations, each of the transparent conductors comprise a degenerately doped semiconductor. In some implementations, each of the transparent conductors runs perpendicular to each of the trenches. In some implementations, each of the transparent conductors is orthogonal to each of the trenches. In some implementations, each of the adherent electrodes comprises a metallic sputter coating. In some implementations, each of the land portions lies in a common plane. In some implementations, each transparent conductor contacts exactly one electrode. In some implementations, each transparent conductor contacts a plurality of electrodes separated one from the next by an equal number of trenches.

Another aspect of this disclosure is directed to a method for making a light-steering optic, the method comprising: forming a series of mutually parallel trenches in a dielectric substrate, a wall of each trench extending up the trench to an adjacent land portion of the dielectric substrate, the land portion separating that trench from a neighboring trench in the series; depositing an adherent electrode on and above a wall of each trench and onto a corresponding contact zone, the contact zone partly covering the land portion adjacent to that wall; filling each trench with liquid crystal; and arranging a series of transparent conductors across the series of parallel trenches, such that each transparent conductor selectively contacts one or more of the electrodes at a corresponding one or more contact zones.

In some implementations, forming the series of parallel trenches includes injection molding. In some implementations, depositing the adherent electrode on the wall surface includes sputtering from an angle oblique to the trenches, such that the wall and adjacent land portion is coated, but a base and opposite wall of each trench remain uncoated. In some implementations, the method further comprises selectively etching sputtered electrode material from the adjacent land portion, except over the contact zone.

Another aspect of this disclosure is directed to a near-eye display system comprising: a microprojector configured to project a virtual display image; a dielectric substrate positioned so as to receive the virtual display image, the dielectric substrate having a series of trenches formed therein, each trench parallel to a direction of receipt of the virtual display image, a wall of each trench extending up the trench to an adjacent land portion of the dielectric substrate, the land portion separating that trench from a neighboring trench in the series; for each trench, an adherent electrode extending up the wall of the trench and onto a corresponding contact zone, the contact zone partly covering the land portion adjacent to that wall; liquid crystal within each trench; and a series of transparent conductors crossing over the series of parallel trenches, each transparent conductor selectively contacting one or more of the electrodes at a corresponding one or more contact zones.

In some implementations, the near-eye display system further comprises a controller configured to bias each of the transparent conductors. In some implementations, the virtual display image includes a sequence of monochromatic component images differing in color, wherein the controller is synchronized to the microprojector and configured to change the bias of each of the transparent conductors to steer corresponding pixels of each component image by an equivalent angle. In some implementations, the controller is configured to bias each of the transparent conductors to steer each pixel of the display image by an equivalent angle. In some implementations, the controller is configured to bias each of the transparent conductors to steer different pixels of the display image by different angles, so as to vary a point of convergence of the display image. In some implementations, the dielectric substrate, the liquid crystal, the electrodes, and the transparent conductors comprise a first light-steering optic, the display system further comprising a second light-steering optic arranged optically downstream of the first light-steering optic, wherein mutually parallel trenches of the second light-steering optic are orthogonal to those of the first light-steering optic.

It will be understood that the configurations and/or approaches described herein are exemplary in nature, and that these specific examples or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A light-steering optic, comprising:
   a dielectric substrate having a series of mutually parallel trenches formed therein, a wall of each trench extending up the trench to an adjacent land portion of the dielectric substrate, the land portion separating that trench from a neighboring trench in the series;
   for each trench, an adherent electrode extending up the wall of the trench and onto a corresponding contact zone, the contact zone partly covering the land portion adjacent to that wall;
   liquid crystal within each trench; and
   a series of transparent conductors crossing over the series of parallel trenches, each transparent conductor selectively contacting one or more of the electrodes at a corresponding one or more contact zones.

2. The light-steering optic of claim 1 wherein the series of parallel trenches has a submicron period.

3. The light-steering optic of claim 1 wherein each of the trenches is at least two microns deep.

4. The light-steering optic of claim 1 wherein each of the transparent conductors comprise a degenerately doped semiconductor.

5. The light-steering optic of claim 1 wherein each of the transparent conductors runs perpendicular to each of the trenches.

6. The light-steering optic of claim 1 wherein each of the transparent conductors is orthogonal to each of the trenches.

7. The light-steering optic of claim 1 wherein each of the adherent electrodes comprises a metallic sputter coating.

8. The light-steering optic of claim 1 wherein each of the land portions lies in a common plane.

9. The light-steering optic of claim 1 wherein each transparent conductor contacts exactly one electrode.

10. The light-steering optic of claim 1 wherein each transparent conductor contacts a plurality of electrodes separated one from the next by an equal number of trenches.

11. A method for making a light-steering optic, the method comprising:
    forming a series of mutually parallel trenches in a dielectric substrate, a wall of each trench extending up the trench to an adjacent land portion of the dielectric substrate, the land portion separating that trench from a neighboring trench in the series;
    depositing an adherent electrode on and above a wall of each trench and onto a corresponding contact zone, the contact zone partly covering the land portion adjacent to that wall;
    filling each trench with liquid crystal; and
    arranging a series of transparent conductors across the series of parallel trenches, such that each transparent conductor selectively contacts one or more of the electrodes at a corresponding one or more contact zones.

12. The method of claim 11 wherein forming the series of parallel trenches includes injection molding.

13. The method of claim 11 wherein depositing the adherent electrode on the wall surface includes sputtering from an angle oblique to the trenches, such that the wall and adjacent land portion is coated, but a base and opposite wall of each trench remain uncoated.

14. The method of claim 11 further comprising selectively etching sputtered electrode material from the adjacent land portion, except over the contact zone.

15. A near-eye display system comprising:
    a microprojector configured to project a virtual display image;
    a dielectric substrate positioned so as to receive the virtual display image, the dielectric substrate having a series of trenches formed therein, each trench parallel to a direction of receipt of the virtual display image, a wall of each trench extending up the trench to an adjacent land portion of the dielectric substrate, the land portion separating that trench from a neighboring trench in the series;
    for each trench, an adherent electrode extending up the wall of the trench and onto a corresponding contact zone, the contact zone partly covering the land portion adjacent to that wall;
    liquid crystal within each trench; and
    a series of transparent conductors crossing over the series of parallel trenches, each transparent conductor selectively contacting one or more of the electrodes at a corresponding one or more contact zones.

16. The near-eye display system of claim 15 further comprising a controller configured to bias each of the transparent conductors.

17. The near-eye display system of claim 15 wherein the virtual display image includes a sequence of monochromatic component images differing in color, and wherein the controller is synchronized to the microprojector and configured to change the bias of each of the transparent conductors to steer corresponding pixels of each component image by an equivalent angle.

18. The near-eye display system of claim 15 wherein the controller is configured to bias each of the transparent conductors to steer each pixel of the display image by an equivalent angle.

19. The near-eye display system of claim 15 wherein the controller is configured to bias each of the transparent conductors to steer different pixels of the display image by different angles, so as to vary a point of convergence of the display image.

20. The near-eye display system of claim 15 wherein the dielectric substrate, the liquid crystal, the electrodes, and the transparent conductors comprise a first light-steering optic, the display system further comprising a second light-steering optic arranged optically downstream of the first light-steering optic, wherein mutually parallel trenches of the second light-steering optic are orthogonal to those of the first light-steering optic.

* * * * *